United States Patent
Yen et al.

(10) Patent No.: US 7,292,259 B2
(45) Date of Patent: Nov. 6, 2007

(54) RECORDING SYSTEM FOR LIGHT-SENSITIVE SHEET

(75) Inventors: Meng-Shin Yen, Taoyuan (TW); Wai William Wang, Taoyuan (TW)

(73) Assignee: BENQ Corporation, Taoyuan (TW)

( * ) Notice: Subject to any disclaimer, the term of this patent is extended or adjusted under 35 U.S.C. 154(b) by 107 days.

(21) Appl. No.: 11/354,554

(22) Filed: Feb. 14, 2006

(65) Prior Publication Data

US 2006/0180749 A1   Aug. 17, 2006

(30) Foreign Application Priority Data

Feb. 15, 2005   (TW)   .............................. 94104340 A

(51) Int. Cl.
   *B41J 27/00*   (2006.01)
   *G02B 5/32*   (2006.01)
(52) U.S. Cl. .................. 347/241; 347/256; 359/15
(58) Field of Classification Search ................ 347/231, 347/239–244, 255–260; 359/15–18, 22–33, 359/562
See application file for complete search history.

(56) References Cited

U.S. PATENT DOCUMENTS

| | | | | |
|---|---|---|---|---|
| 4,848,863 A | * | 7/1989 | Kramer | 359/18 |
| 5,291,317 A | * | 3/1994 | Newswanger | 359/15 |
| 5,448,403 A | * | 9/1995 | Harris | 359/562 |

* cited by examiner

*Primary Examiner*—Hai Pham
(74) *Attorney, Agent, or Firm*—Birch, Stewart, Kolasch & Birch, LLP

(57) ABSTRACT

The invention provides a system for recording a datum onto a pixel on a light-sensitive sheet. The system essentially includes a light-emitting device and an interfering device. The interfering device has a plurality of gratings. According to the datum, at least one grating is selected from the plurality of gratings. Before the datum is recorded, the selected grating and the light-emitting device are both moved so as to align with the pixel. Then, the light-emitting device is driven to emit a light through the selected grating. Thereby, the datum is recorded on the pixel.

9 Claims, 4 Drawing Sheets

RECORDING SYSTEM FOR LIGHT-SENSITIVE SHEET

BACKGROUND OF THE INVENTION

1. Field of the Invention

Figure 1:
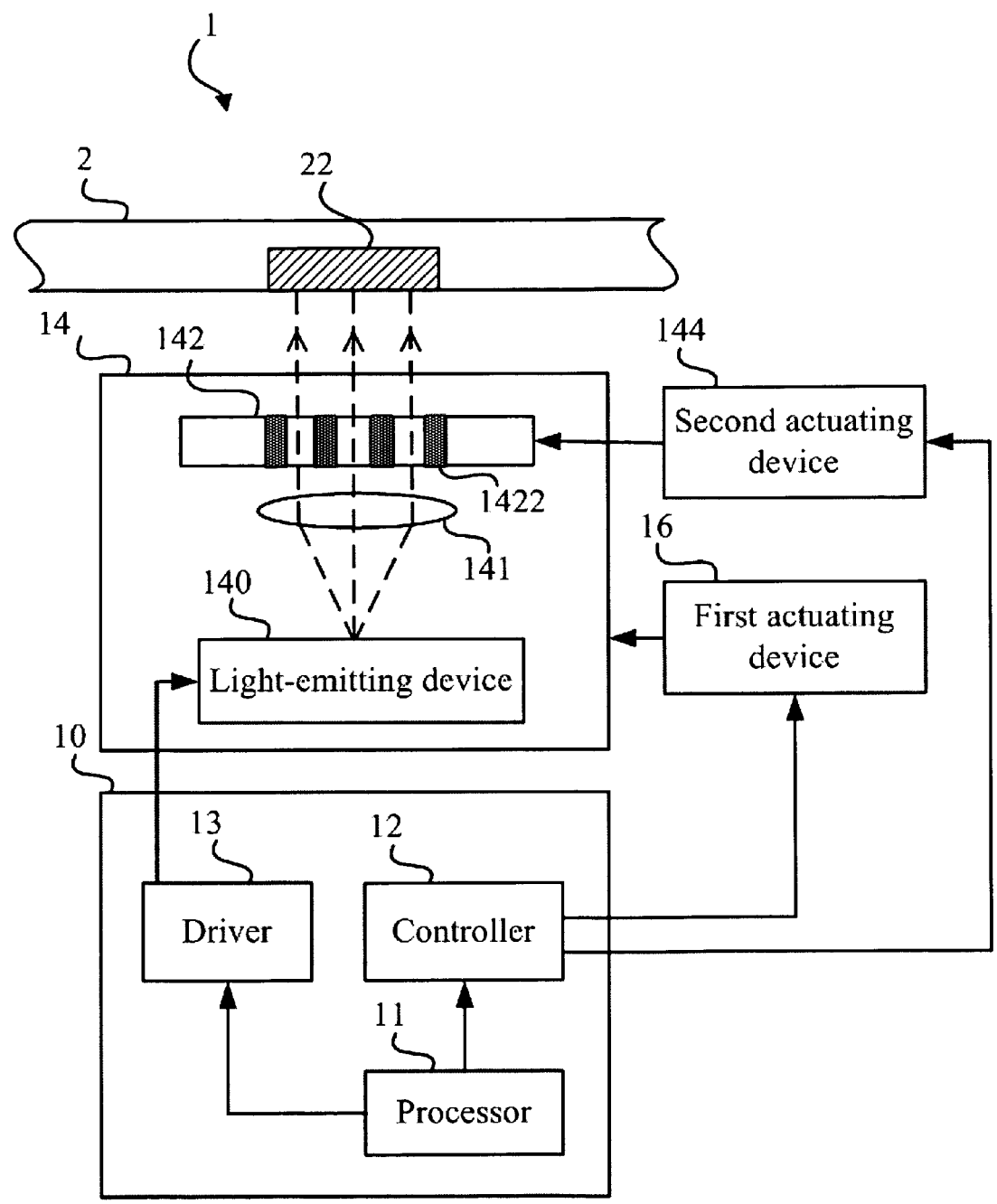

The present invention relates to a recording system, and more particularly, to a system for recording data, such as images, onto a light-sensitive sheet.

2. Description of the Prior Art

As modern technology continues to develop, users can now easily print their pictures stored in digital formats, such as bitmap or JPEG, on paper through ink-jet printing or laser-jet printing.

Currently, there are a variety of light-sensitive sheets or films that have been developed to form images thereon in response to lights of primary colors (i.e. red, green, and blue); examples of these light-sensitive sheets or films are cycolor paper, dry Ektacolor paper, or other similar mediums. However, the applications of these products are usually restricted due to the need of darkroom processing and associated professional knowledge.

Accordingly, the objective of the invention is to provide a system for recording data, such as images, on a light-sensitive sheet. Particularly, the system of the present invention has the advantages of uncomplicated design, easy assembling, and low production cost.

SUMMARY OF THE INVENTION

According to a preferred embodiment of the invention, the recording system is used for recording a datum onto a pixel on a light-sensitive sheet. The recording system of the invention includes a controlling/processing unit, a recording head, and a first actuating device. The controlling/processing unit includes a processor, a controller, and a driver. The recording head includes a light-emitting device, an interfering device, and a second actuating device.

The processor is used for receiving the datum. The controller, which is operated by the processor, controls the first actuating device and the second actuating device. The recording head is disposed on one side of the light-sensitive sheet where the pixel is formed. The light-emitting device is used for emitting a light beam when being driven. The interfering device, on which a plurality of gratings are provided, is disposed in a way that once the light is emitted by the light-emitting device, the light beam will be interfered by one of the gratings on the interfering device, and the interfered light has a respective intensity corresponding to the grating. The processor determines one grating out of all the gratings in accordance with the datum.

The second actuating device is controlled by the controller to move the interfering device, such that once the light is emitted by the light-emitting device, the light beam will be interfered by the grating determined by the processor. The first actuating device is used for movably carrying the recording head, and it is controlled by the controller to move the recording head, such that the light-emitting device of the recording head is positioned at a position corresponding to the pixel on the light-sensitive sheet. The driver, which is operated by the processor, is used for driving the light-emitting device to emit the light through the grating determined by the processor onto the pixel. Thereby, the datum is recorded on the pixel.

The advantage and spirit of the invention may be understood by the following recitations together with the appended drawings.

BRIEF DESCRIPTION OF THE APPENDED DRAWINGS

FIG. 1 is a schematic diagram showing the configuration and function devices of the recording system according to a preferred embodiment of the invention.

Figure 2A:
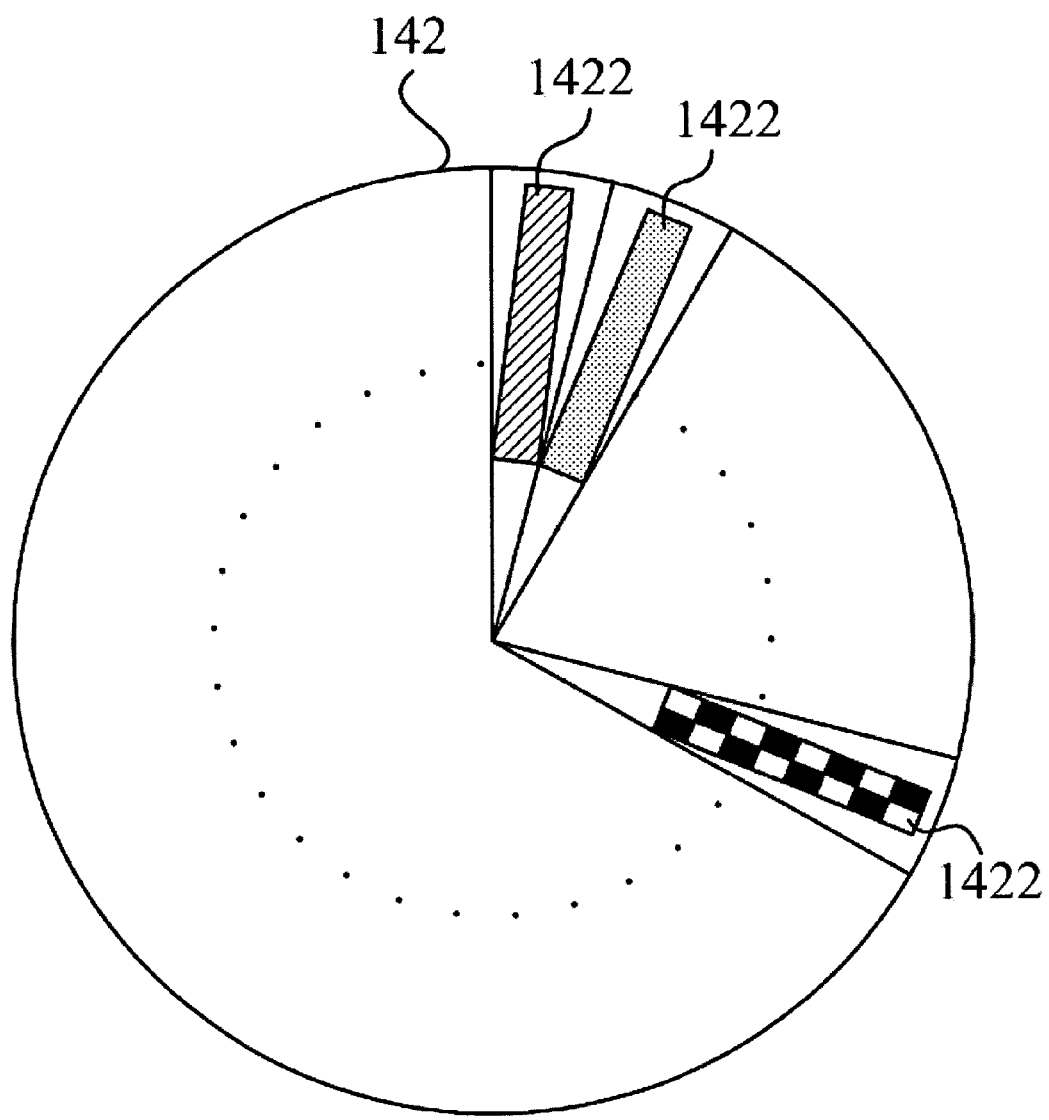

FIG. 2A schematically illustrates an embodiment of the interfering device shown in FIG. 1, which is implemented as a grating disk.

Figure 2B:
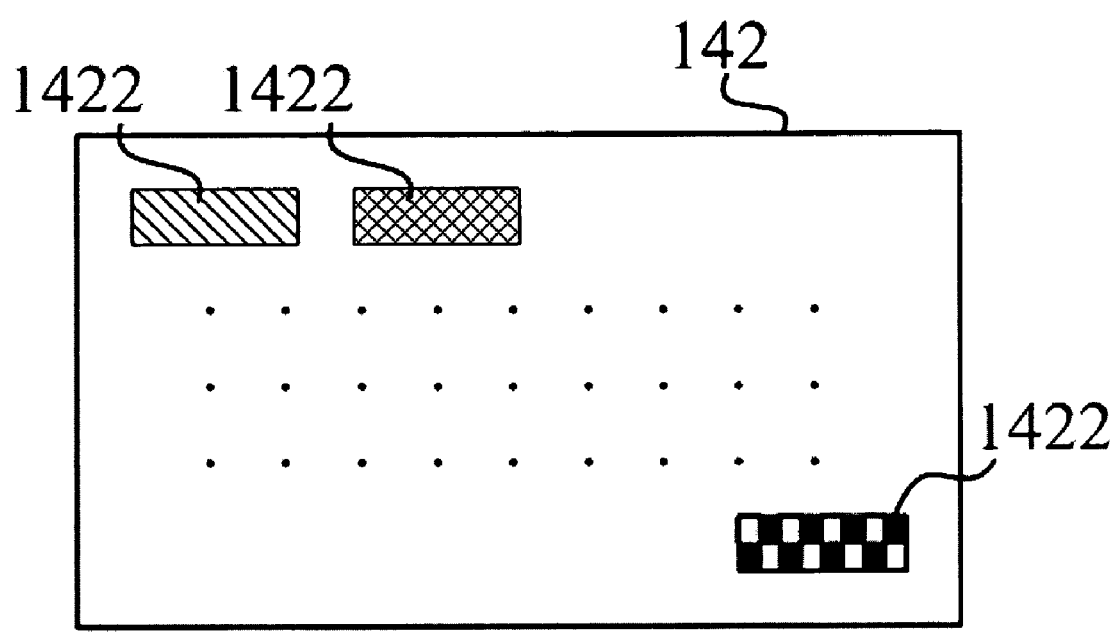

FIG. 2B schematically illustrates an embodiment of the interfering device shown in FIG. 1, which is implemented as a grating plate.

Figure 3:
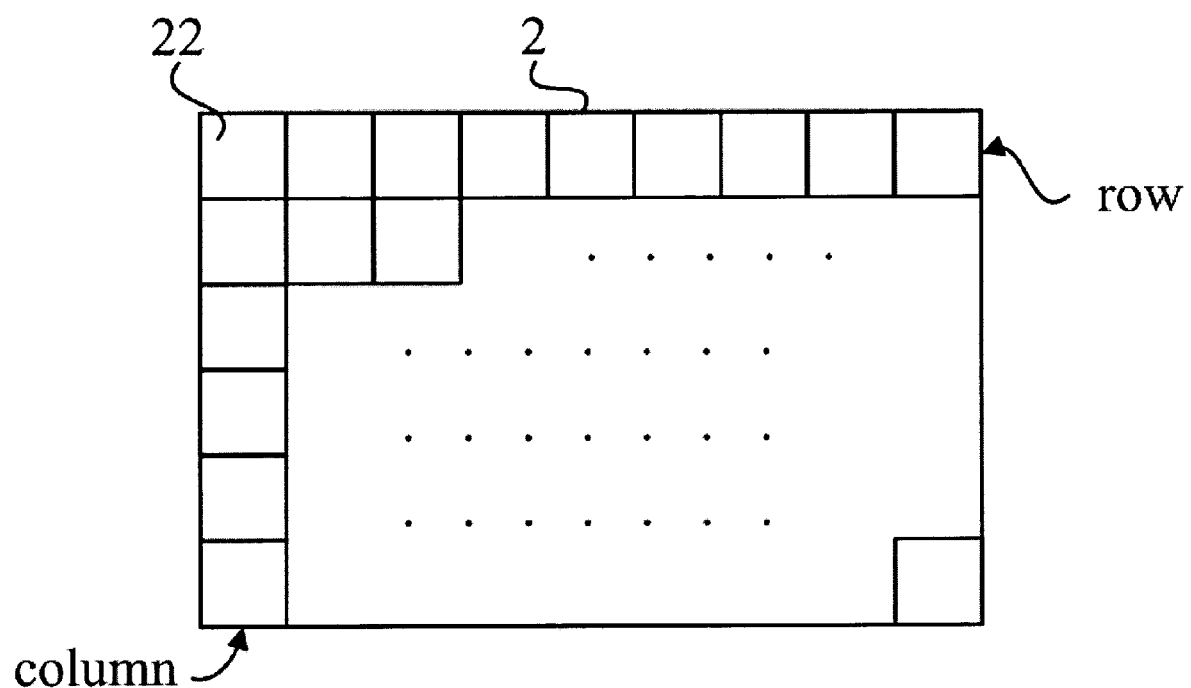

FIG. 3 is a schematic diagram showing that a plurality of pixels is arranged in an array on the light-sensitive sheet.

DETAILED DESCRIPTION OF THE INVENTION

The objective of the invention is to provide a system for recording data, such as images, on a light-sensitive sheet. Particularly, the recording system of the invention has the advantages of uncomplicated design, easy assembling, and low production cost. The description of several embodiments according to the invention will be given to explain the features, spirits, benefits, and convenience of the invention.

Please refer to FIG. 1. FIG. 1 is a schematic diagram showing the configuration and function devices of a recording system 1 according to a preferred embodiment of the invention. Hereinafter, explanations will be given to clarify the operations performed by the recording system 1 to record a datum onto a pixel 22 on a light-sensitive sheet 2.

The light-sensitive sheet 2 changes its color in response to lights of various colors, such as the three primary colors (i.e. red, green, and blue). In an embodiment, the light-sensitive sheet 2 can be a variety of color papers, such as cycolor paper or dry Ektacolor paper.

As shown in FIG. 1, the recording system 1 according to the preferred embodiment of the invention includes a controlling/processing unit 10, a recording head 14, and a first actuating device 16. The controlling/processing unit 10 includes a processor 11, a controller 12, and a driver 13. The processor 11 is used for receiving the datum. The controller 12, which is operated by the processor 11, controls the first actuating device 16 and a second actuating device 144.

Also shown in FIG. 1, the recording head 14 includes a light-emitting device 140, an interfering device 142, and the second actuating device 144. The recording head 14 is disposed to face one side of the light-sensitive sheet 2 where the pixel 22 is formed to record the datum. The light-emitting device 140 is used for emitting a light beam. The interfering device 142 has a plurality of gratings 1422. The interfering device 142 is disposed in a way, so that the light is interfered by at least one of the gratings 1422. Specifically, the processor 11 determines the at least one grating out of the gratings 1422 in accordance with the datum.

The second actuating device 144 is used for movably carrying the interfering device 142. The controller 12 controls the second actuating device 144 to move the interfering device 142 to interfere the light.

In an embodiment, as shown in FIG. 2A, the interfering device 142 can be implemented as a round grating disc, on which the gratings 1422 are arranged to surround the center of the grating disc. It should be noted that FIG. 2A only depicts three out of all the gratings 1422 provided on the disc. The second actuating device 144 can include a stepping motor or the like to rotate the disc, so as to align the grating 1422 determined by the processor 11 with the light-emitting device 140. In another embodiment, as shown in FIG. 2B, the interfering device 142 can be implemented as a rectangular grating plate, on which the gratings 1422 are arranged in an array. The second actuating device 144 can include a linear motor or other similar devices to move the rectangular grating plate linearly, so as to align the grating 1422 determined by the processor 11 with the light-emitting device 140.

As shown in FIG. 1, the first actuating device 16 is used for movably carrying the recording head 14. The controller 12 controls the first actuating device 16 to move the recording head 14, ot a position corresponding to the pixel 22 on the light-sensitive sheet 2. The driver 13, which is operated by the processor 11, is used for driving the light-emitting device 140 to emit the light through the grating 1422 determined by the processor 11 onto the pixel. Thereby, the datum is recorded on the pixel 22.

In an embodiment, each pixel 22 on the sheet 2 is constituted by N color fields. The datum to be recorded includes values of N colors, wherein each color value of N colors corresponds to one of the N color fields, and N is a natural number. The light-emitting device 140 includes N light sources which each emits one of the lights of the N colors. In practical applications, the N color values include red, green, and blue color values, and the light-emitting device 140 includes light sources of red, green and blue colors. The three light sources are turned on successively during the data recording process.

In an embodiment, as shown in FIG. 3, the light-sensitive sheet 2 consists of a plurality of pixels 22, and the pixels 22 are arranged in rows and columns on the sheet 2. According to the recording system 1 of the invention, the data recording process on the pixel matrix can be accomplished in row-by-row order or column-by-column order. Taking the row-by-row order as an example, the processor 11 receives the data corresponding to the first row of the pixel matrix 22 in sequence, and the components of the recording system 1 cooperates, according to the method described in aforementioned embodiments, to record the data onto the corresponding pixels 22 of the first row of the pixel matrix. After the data recording corresponding to the first row of the pixel matrix 22 is finished, the processor 11 proceeds to receive the data corresponding to second row of the pixel matrix 22 in sequence. The data recording process is iterated until all data have been recorded onto the corresponding rows of the pixel matrix 22.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A system for recording a datum onto a pixel on a light-sensitive-sheet, said system comprising:
    a controlling/processing unit for receiving the datum, and controlling a first actuating device and a second actuating device;
    a recording head disposed to face a side of the sheet where the pixel is formed when the sheet is installed in said system, the recording head comprising:
        a light-emitting device for emitting a light;
        an interfering device having a plurality of gratings, the interfering device being disposed in a way, so that the light is interfered by at least one of the plurality of gratings, wherein the controlling/processing unit determines the at least one grating from the plurality of gratings in accordance with the datum; and
        the second actuating device, for movably carrying the interfering device, the controlling/processing unit controlling the second actuating device to move the interfering device to interfere the light; and
    the first actuating device, for movably carrying the recording head, the controlling/processing unit controlling the first actuating device to move the recording head to a position corresponding to the pixel on the sheet.

2. The system according to claim 1, wherein the controlling/processing unit comprises a processor for receiving the datum and determining the at least one grating from the plurality of gratings in accordance with the datum.

3. The system according to claim 2, wherein the controlling/processing unit further comprises a controller, operated by the processor, for controlling the first actuating device and the second actuating device.

4. The system according to claim 3, wherein the controlling/processing unit further comprises a driver, operated by the processor, for driving the light-emitting device to emit the light through the grating determined by the processor onto the pixel.

5. The system according to claim 1, wherein the pixel is constituted by N color fields, and the datum comprises values of N colors of which each corresponds to one of the N color fields, and N is a natural number.

6. The system according to claim 5, wherein the light-emitting device comprises N light sources of which each emits one of the lights of the N colors.

7. The system according to claim 6, wherein the N light sources are turned on successively.

8. The system according to claim 5, wherein the N color values comprise red, green and blue color values.

9. The system according to claim 1, wherein the light-sensitive sheet is a color paper.

* * * * *